United States Patent [19]
Brickell et al.

[11] Patent Number: 5,299,262
[45] Date of Patent: Mar. 29, 1994

[54] METHOD FOR EXPONENTIATING IN CRYPTOGRAPHIC SYSTEMS

[75] Inventors: Ernest F. Brickell, Albuquerque, N. Mex.; Daniel M. Gordon, San Diego, Calif.; Kevin S. McCurley, Albuquerque, N. Mex.

[73] Assignee: The United States of America as represented by the United States Department of Energy, Washington, D.C.

[21] Appl. No.: 929,929

[22] Filed: Aug. 13, 1992

[51] Int. Cl.$^5$ .............................................. H04K 1/00
[52] U.S. Cl. ...................................... 380/28; 380/30; 380/50
[58] Field of Search ..................... 380/28, 30, 50, 49

[56] References Cited

U.S. PATENT DOCUMENTS

| | | |
|---|---|---|
| 4,200,770 | 4/1980 | Hellman et al. |
| 4,424,414 | 1/1984 | Hellman et al. |
| 4,748,668 | 5/1988 | Shamir et al. ........................... 380/30 |
| 4,933,970 | 6/1990 | Shamir ................................... 380/30 |
| 4,964,164 | 10/1990 | Fiat ....................................... 380/30 |
| 4,995,082 | 2/1991 | Schnorr ................................. 380/23 |
| 5,121,429 | 6/1992 | Guppy et al. .......................... 380/30 |
| 5,166,978 | 11/1992 | Quisquater ............................ 380/30 |

OTHER PUBLICATIONS

W. Diffie et al., "New Directions in Cryptography", *IEEE Transactions on Information Theory*, vol. 22, No. 6, Nov. 1976, pp. 644–654.
T. ElGamal, "A Public Key Cryptosystem and a Signature Scheme Based on Discrete Logarithms", *IEEE Transactions on Information Theory*, vol. 31, No. 4, Jul. 1985, pp. 469–472.
A. Fiat et al., "How to Prove Yourself: Practical Solutions to Identification and Signature Problems", *Advances in Cryptology (Proceedings of Crypto '86)*, vol. 263, 1987, pp. 186–194.
C. P. Schnorr, "Efficient Identification and Signatures for Smart Cards", *Advances in Cryptology (Proceedings of Crypto '89)*, vol. 435, 1990, pp. 239–251.
C. P. Schnorr, "Efficient Signature Generation for Smart Cards", *Journal of Cryptology*, vol. 4, No. 3, 1991, pp. 161–174.
E. Brickell et al., "An Interactive Identification Scheme Based on Discrete Logarithms and Factoring", *Advances in Cryptology (Proceedings of Eurocrypt '90)*, vol. 473, May 1990, pp. 63–71.
D. E. Knuth, *The Art of Computer Programming*, vol. 2, Seminumerical Algorithms, Second Edition, 1981, pp. 194, 441–447, and 564.
G. B. Agnew et al., "Fast Exponentiation in GF($2^n$)", *Advances in Cryptology (Proceedings of Eurocrypt '88)*, vol. 330, May 1988, pp. 251–255.
T. Beth et al., "Architectures for Exponentiation in GF($2^n$)", *Advances in Cryptology (Proceedings of Crypto '86)*, vol. 263, 1986, pp. 302–310.

(List continued on next page.)

*Primary Examiner*—Tod R. Swann
*Attorney, Agent, or Firm*—Karuna Ojanen; James H. Chafin; William R. Moser

[57] ABSTRACT

An improved cryptographic method utilizing exponentiation is provided which has the advantage of reducing the number of multiplications required to determine the legitimacy of a message or user. The basic method comprises the steps of selecting a key from a preapproved group of integer keys g; exponentiating the key by an integer value e, where e represents a digital signature, to generate a value $g^e$; transmitting the value $g^e$ to a remote facility by a communications network; receiving the value $g^e$ at the remote facility; and verifying the digital signature as originating from the legitimate user. The exponentiating step comprises the steps of initializing a plurality of memory locations with a plurality of values $g^{x_i}$; computing $a_i$ representations for a integer base b, where $a_i$ represents the weighing factor of the ith digit of the integer e; computing the individual values of $c_d$ according to the rule: $c_d = \pi_{a_i = d} g^{x_i}$; and computing the product of $\pi_{d=1}^h C_d^d$ from the stored values of $g^{x_i}$ from the plurality of memory locations so as to determine a value for $g^e$.

9 Claims, 7 Drawing Sheets

ElGamal Signatures

- Common parameters: a large prime $p$, a generator $g$ of the group GF($p$).
- Public key $y$ for prover
- Private key $k$ for prover such that $g^k \equiv y \bmod p$.

100 —
- Preprocessing: Prover picks $e \in_r [1, p-1]$ with $\gcd(e, p-1) = 1$, and compute $r \equiv g^e \bmod p$.
  - Signature generation: To sign a message $m$,
    - compute $s$ such that $H(m) \equiv es + kr \bmod (p-1)$.
    - $(r, s)$ is the prover's signature of $m$.
  - Signature verification: check that $g^{H(m)} \equiv y^r r^s \bmod p$.

OTHER PUBLICATIONS

T. Beth, "Efficient Zero-Knowledge Identification Scheme for Smart Cards", *Advances in Cryptology (Proceedings of Eurocrypt '88)* vol. 330, May 1988, pp. 77–84.

D. R. Stinson, "Some Observations on Parallel Algorithms for Fast Exponentiation in $GF(2^n)$", *SIAM J. Comput.*, vol. 19, No. 4, Aug. 1990, pp. 711–717.

J. Bos et al., "Addition Chain Heuristics", *Advances in Cryptology (Proceedings of Crypto 1989)*, vol. 435, 1990, pp. 400–407.

D. Matula, "Basic Digit Sets for Radix Representation", *Journal of the ACM*, vol. 29, No. 4, Oct. 1982, pp. 1131–1143.

R. Rivest et al., "A Method for Obtaining Digital Signatures and Public Key Cryptosystems", *Communications of the ACM*, vol. 21, No. 2, Feb. 1978, pp. 120–126.

A. Yao, "On the Evaluation of Powers", *SIAM J. Comput.*, vol. 5, No. 1, Mar. 1976, pp. 100–103.

Schnorr Identification Scheme

- Public - primes $q, p$ with $q \mid p-1$ and $g$ with $g^q \equiv 1 \bmod p$.
- Prover chooses secret $k$, computes $y \equiv g^{-k} \bmod p$ and gives $y$ to the verifier.
- Preprocessing step: Prover chooses $e \in_r [1, q]$ and computes $r \equiv g^e \bmod p$.
- To prove identity:
  - Prover sends $r$ to the verifier
  - Verifier sends the prover $E \in_r [0, 2^t]$. ($t$ - a security parameter)
  - Prover computes $s \equiv e + kE \bmod q$ and sends $s$ to the verifier.
  - Verifier accepts proof of identity if $g^s y^E \equiv r \bmod p$.

Figure 2a

Brickell-McCurley Identification Scheme

- Prover chooses primes $q, w, p$ with $qw \mid p-1$ and $g$ with $g^q \equiv 1 \bmod p$.
- Prover chooses secret $k$, computes $y \equiv g^{-k} \bmod p$ and gives $p, y$, and $g$ to the verifier.
- Preprocessing step: Prover chooses $e \in_r [1, q]$ and computes $r \equiv g^e \bmod p$.
- To prove identity:
  o Prover sends $r$ to the verifier.
  o Verifier chooses $E \in_r [0, 2^t]$ and sends $E$ to the prover. (t - security parameter)
  o Prover computes $s \equiv e + kE \bmod p - 1$ and sends $s$ to the verifier.
  o Verifier accepts proof of identity if $g^s y^E \equiv r \bmod p$.

Figure 2b

ElGamal Signatures

- Common parameters: a large prime $p$, a generator $g$ of the group $GF(p)$.
- Public key $y$ for prover
- Private key $k$ for prover such that $g^k \equiv y \bmod p$.
- Preprocessing: Prover picks $e \in_r [1, p-1]$ with $\gcd(e, p-1) = 1$, and compute $r \equiv g^e \bmod p$.
- Signature generation: To sign a message $m$,
  - compute $s$ such that $H(m) \equiv es + kr \bmod (p-1)$.
  - $(r, s)$ is the prover's signature of $m$.
- Signature verification: check that $g^{H(m)} \equiv y^r r^s \bmod p$.

Figure 3a

Schnorr Signatures (final form)

- Common parameters: primes $q, p$ with $q \mid p-1$, $g$ with $g^q \equiv 1 \bmod p$.
- Public key $y$ for prover.
- Private key $k$ for prover, such that $g^{-k} \equiv y \bmod p$.
- 100 — Preprocessing: Pick $e \in_r [1, q]$ and compute $r \equiv g^e \bmod p$.
- Signature generation: To sign message $m$:
  - Prover computes $s \equiv e + kH(m, r) \bmod q$.
  - $(r, s)$ is prover's signature of $m$.
- Signature verification: check that $g^s y^{H(m,r)} \equiv r \bmod p$.

Figure 3b

DSS Generation

- Common parameters: primes $q, p$ with $q \mid p-1$, $g$ with $g^q \equiv 1 \bmod p$.
- Public key $y$ for prover.
- Private key $k$ for prover, such that $g^k \equiv y \bmod p$.
- Preprocessing: Pick $e \in_r [1, q]$ and compute $r \equiv (g^e \bmod p) \bmod q$.
- Signature generation: To sign message $m$:
  - Prover computes $s$ such that $H(m) \equiv es - kr \bmod q$.
  - $(r, s)$ is prover's signature of $m$.

Figure 3c

DSS Verification

- Signature verification:
  - Compute $e \equiv H(m)s^{-1} \bmod q$.
  - Compute $v \equiv rs^{-1} \bmod q$.
  - 100 —— Compute $z \equiv g^e y^v \bmod p$.
  - Check that $z \equiv r \bmod q$.

Figure 4

METHOD FOR EXPONENTIATING IN CRYPTOGRAPHIC SYSTEMS

The United States Government has rights in this invention pursuant to Contract No. DE-AC04-76DP00789 between the Department of Energy and AT&T Company.

FIELD OF THE INVENTION

This invention relates generally to cryptography and more specifically, to an improved method for fast exponentiation utilized in cryptographic schemes.

BACKGROUND OF THE INVENTION

Cryptographic systems ensure the privacy and authenticity of messages communicated over communication lines, and generally may be categorized into three distinct types of systems, e.g., privacy systems, identification systems, key exchange system, and digital signature systems.

A privacy or secrecy system prevents the extraction of information by unauthorized parties from messages transmitted over the communications line, thus assuring the sender that it is being read only by the intended receiver.

Identification is used in, for instance, military applications, identification of remote computer users, identification of the person using a smart card or ATM card, identification of employees at their location of employment, and identification of cellular telephone customers. For example, the cellular telephone industry has recently experienced major financial losses from fraud because they do not use sound cryptographic techniques for the identification of telephones that roam outside of their home system.

A digital signature system provides a means for verifying the authenticity of a message, thus assuring the receiver of a message the legitimacy of the message. The notion of a digital signature was apparently first mentioned in the seminal paper by Diffie and Hellman, "New Directions in Cryptography", IEEE Transactions on Information Theory, Vol. 22, pp. 472–492 (1976), in which they described how a digital signature scheme could be realized from a public key crytosystem. There have been several methods proposed for realizing digital signatures, including the RSA scheme; the ElGamal scheme in T. ElGamal "A public key cryptosystem and a signature scheme based on discrete logarithms", IEEE Transactions on Information Theory, Vol. 31, pp. 469–472 (1985); the Fiat-Shamir scheme in "How to prove yourself: Practical solutions to identification and signature problems", Advances in Cryptology (proceedings of Crypto '86), Vol. 263, pp. 186–199 (1987); the Schnorr scheme as described in "Efficient Identification and Signatures for Smart Cards", Advances in Cryptology (Proceedings of Crypto '89), Vol. 435, pp. 239–252 (1990); and the Brickell-McCurley scheme described in "An interactive identification scheme based on discrete logarithms and factoring", Advances in Cryptology (Proceedings of Eurocrypt '90), May 1990.

Interest in digital signatures is increasing rapidly, as evidenced by the recent announcement by the National Institute of Standards and Technology (NIST) of a proposed national standard for digital signatures. It is reasonable to assume that this standard will have at least as much impact as NIST's previous endorsement of the Data Encryption Algorithm, known as DES. The signature standard has not yet been approved, but the current proposal is a variation of the ElGamal scheme. This proposed standard will henceforth be referred to as DSS.

Additionally, in the above secrecy, identification, and signature systems, a secure key exchange may occur. A secure key is an exchange between two parties communicating over an insecure communications line wherein the parties agree upon a common secret piece of information which is utilized in the encryption system. An easy method for accomplishing a secure key exchange was invented by Diffie and Hellman and has been used by Sun Microsystems in security additions to their UNIX networking software.

A fundamental process common to all of these cryptographic systems is the process of a one-way function, f. One party uses an input x, which is kept secret, to produce an output, $y = f(x)$, which is not kept secret. The function f is described as one-way if it is infeasible to invert the function, i.e. given y, it is infeasible to find x so that $f(x) = y$.

A process used in a number of the cryptographic systems as a one-way function is that of raising an element (g) of a mathematical structure known as a group to a large integer power (e). This process is called exponentiation. The reason for this is that computing $g^e$ is relatively easy, whereas computing e from knowledge of g and $g^e$ is believed to be infeasible.

Several U.S. Patents utilize exponentiation as a one-way function. U.S. Pat. No. 4,424,414, entitled "Exponentiation Cryptographic Apparatus and Method" to Hellman et al., Jan. 3, 1984 discloses a cryptographic system that transmits a computationally secure cryptogram that is generated from a secret transformation of the message sent by the authorized transmitter. This system utilizes an enciphering key K, a deciphering key D, a plaintext message P and a ciphertext C. In operation, the ciphertext C is decrypted into the plaintext P by exponentiating, by modular q arithmetic, the ciphertext C with the deciphering key D.

U.S. Pat. No. 4,200,770, entitled "Cryptographic Apparatus and Method", to Hellman et al., Apr. 29, 1980 discloses a cryptographic system which eliminates the need for a secure channel for exchanging keys. This system also utilizes exponentiation as a one-way function. In this system the first party transforms a first signal $x_1$, into a second $y_1$, such that $y_1 = a^{x_1} \bmod q$. The second party transforms a third signal $x_2$ into a fourth signal $y_2$ such that $y_2 = a^{x_2} \bmod q$. The signals $y_1$ and $y_2$ are exchanged over a possibly insecure channel. Then both parties compute a fifth signal $y_1^{x_2} = a^{x_1 x_2} = y_2^{x_1} \bmod q$, which can then be used as a secret key.

One of the fundamental problems that arises in the implementation of the above exponentiation process is the difficulty of carrying out exponentiation of one element g in a group to a large integer power e.

The process most often used for computing a power $g^e$ is known as the binary method, and is described in detail in a book by D. E. Knuth, *The Art of Computer Programming*, Vol 2, Seminumerical Algorithms, Second Edition (1981). In the binary method, $g^e$ is computed by first converting e into its binary representation. For example, if $e = 23$, this binary representation is 10111. Thereafter, each occurrence of a 1 in the binary representation is replaced by a SX and each 0 is replaced by a S. Thus the binary representation in the example above is transformed to SX S SX SX SX. In this transform, S stands for the arithmetic squaring of the prior value of the rule and X stands for the arithmetic multiplication of the prior value of the rule. Additionally, for the proper function of this rule, the first SX is removed. Thus, the final rule in the example above is SSXSXSX, which translates into square, square, multiply by g, square, multiply by g, square, and multiply by g. This involves successively computing $g^2$, $g^4$, $g^5$, $g^{10}$, $g^{11}$, $g^{22}$, and finally arriving at $g^{23}$. As can be seen this is much faster than multiplying g by itself 22 times.

Depending on what group is selected for the cryptographic scheme, the multiplications are often fairly time-consuming operations. For example, if the group is the set of residue classes modulo an integer (n) of size around $2^{512}$, as might, for example, be used in the ElGamal, DSS, or RSA schemes, then the multiplications involve arithmetic on very large integers and are relatively complicated. Using the above binary method, $g^e$ may be computed using at most $2 \lceil \log_2 e \rceil$ modular multiplications. It is desirable to find a method for computing $g^e$ that requires as few multiplications as possible.

The binary method just described is in fact a special case of the method based on addition chains for the exponent e, which is also described in *The Art of Computer Programming*. Short addition chains give rise to relatively good methods for computing $g^e$, i.e., methods that require few multiplications in the group.

One fundamental limitation on addition chains is that the number of group multiplications using an addition chain is bounded below by the length of the chain, and this is in turn bounded below by the number of binary digits in the exponent e. Thus, this scheme would be limited to 512 multiplications for a 512 bit exponent. It follows that a method based on addition chains alone cannot yield a method using fewer multiplications.

For some special types of groups (G), faster methods are known. In particular, for the case of exponentiation in a finite field of the form GF $(2^n)$, methods exist that exploit the fact that squaring an element in this group can often be done quickly in hardware. Details for this method can be found in the following articles: Agnew, Mullin and Vanstone, "Fast exponentiation in GF($2^n$)", Advances in Cryptology-Eurocrypt '88, Vol. 330, pp. 251–255 (1988); Beth, Cook and Gollman, "Architectures for exponentiation in GF($2^n$)", Advances in Cryptology-Crypto '86, Vol. 263, pp. 302–310 (1986); and Stinson, "Some observations on parallel algorithms for fast exponentiation in GF($2^n$)", Siam J. Comput., Vol. 19, pp. 711–717 (1990). The major drawback to these methods is the limitation to the groups GF($2^n$), where the current difficulty of inverting the exponentiation function in these groups dictates that n be fairly large.

SUMMARY OF THE INVENTION

According to the invention, an improved method is provided for cryptographic methods which utilize exponentiation of a fixed generator or value has the advantage of reducing the number of multiplications required to compute the exponentiation used in the cryptographic method.

The method comprises the steps of exponentiating the generator g by an integer value e, where e represents a signal used in the cryptographic system, to generate a value $g^e$. The exponentiating step further comprises the steps of initializing a plurality of memory locations with a plurality of values $g^{x_i}$ one value corresponding to each individual memory location of the plurality of memory locations, where $x_i$ is selected according to the rule $x_i = mb^k$ and where b represents an integer base and the values of m are selected from a set M and the values for k are greater than or equal to 0 and less than or equal to the least integer exceeding $\log_b n$; computing $a_i$ so that $$e = \sum_{i=1}^{s} a_i x_i$$

and $0 \leq a_i \leq h$, computing the individual values of $c_d$ according to the rule: $C_d = \pi_{a_i = d} g^{x_i}$, wherein d varies over the integers greater than or equal to 1 and less than or equal to h and the individual values of $c_d$ correspond to the product of the base, g, raised to the power $x_i$ for all those i in which the digit $a_i = d$ in the above representation of the integer e from the stored values of $g^{x_i}$ from the plurality of memory location; and computing the product of $\pi_{d=1}^{h} C_d^d$ so as to thereby determine a value for $g^e$.

Other features and advantages of the invention will be set forth in, or apparent from, the following detailed description of the preferred embodiment of the invention.

BRIEF DESCRIPTION OF THE DRAWINGS

FIGS. 2a and 2b illustrate the implementation of the invention in several identification schemes.

FIGS. 3a, 3b, and 3c illustrate the implementation of the invention in several signature schemes.

FIG. 4 illustrates the implementation of the invention in a verification scheme.

DESCRIPTION OF THE INVENTION

Figure 1:
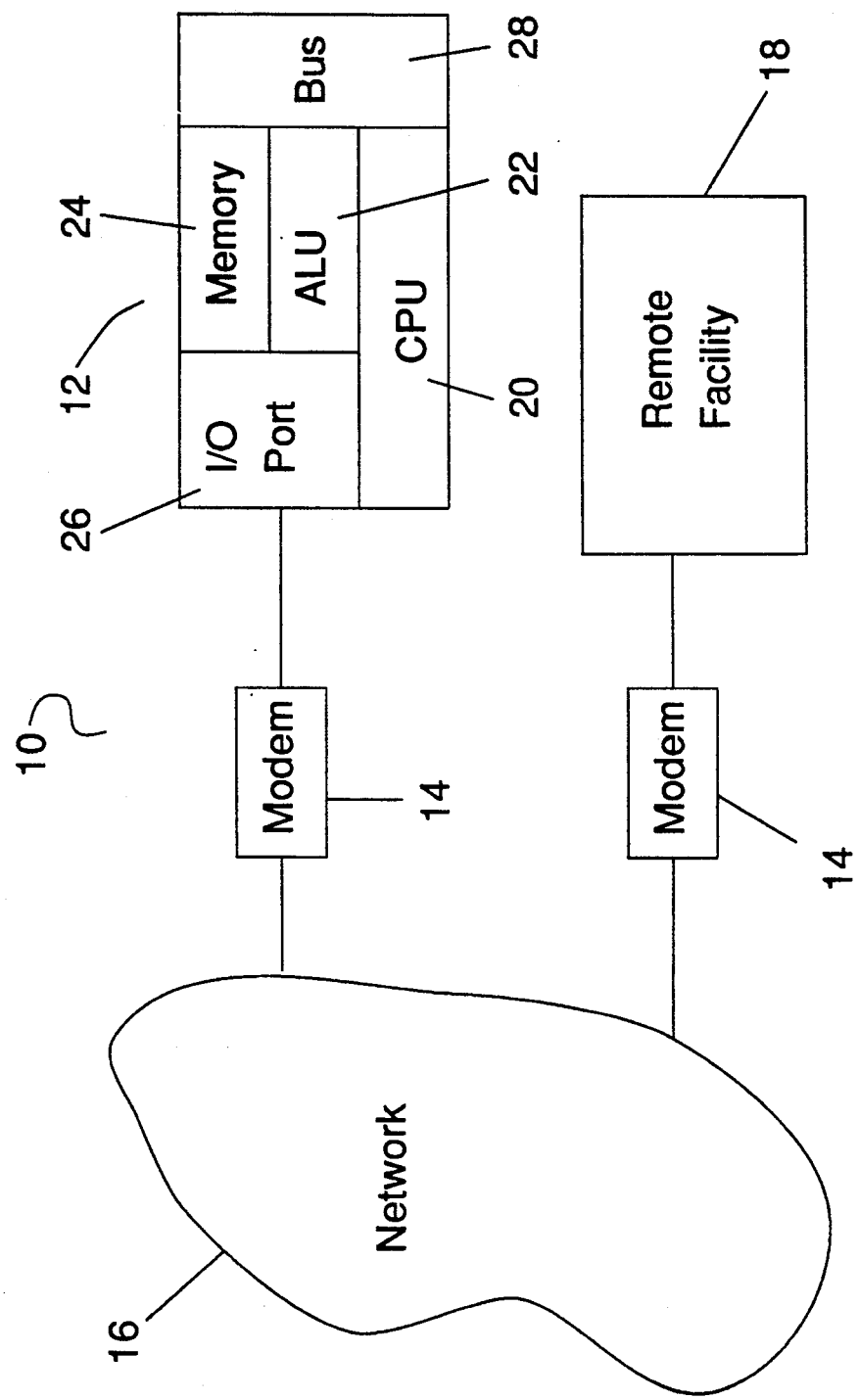
FIG. 1 is a block diagram of a cryptographic system, utilizing an improved method of exponentiation, constructed in accordance with a preferred embodiment of the invention.

Referring to the drawing, a cryptographic system for maintaining the privacy and/or verifying the integrity of a digital signal, generally denoted 10, is illustrated which incorporates an improved method for exponentiating. The cryptographic system 10 comprises a computing device 12 having network interfaces or modems 14 for allowing the card 12 to communicate over a communications network 16 to a receiver 18, which may be remote.

Computing device 12 includes a central processor or CPU 20 for carrying out, inter alia, the various mathematical processes described below. The digital cryptographic system 10 also comprises a random access memory 24, part of which may be read-only, for storing values utilized in the process below, an input/output port 26 for allowing connection to the modems 14 and other devices such as magnetic card readers (not shown), and a communications bus 28 for allowing the transfer of information between elements 20, 24, and 26. It should be noted that computing device 12 is exemplary of any input device which may be utilized to generate the cryptographic signal which is output to a communications network 16.

As discussed above, many cryptographic systems utilize a fundamental process of raising an element (g) of a group to a large integer power (e). As stated, the reason for this is that computing $g^e$ is relatively easy, whereas computing e from the knowledge of g and $g^e$ is believed to be difficult. Thus, considering a banking system as an example, wherein the above computing device 12 is a smart card, e corresponds to a signal that the user randomly generates, and g is a fixed signal representative of an integer or group of integers preselected in agreement with the bank or established by the digital signature standard (DSS).

There are two possible ways to vary $g^e$, the first being where g is changed often but e remains fixed, as in the case of the RSA schemes; and the second is where e is changed more often, as in the case of the ElGamal, Diffie-Hellman, DSS, and Schnorr schemes and g remains fixed. The particular way in which $g^e$ is varied will depend on the specifics of the cryptographic system 10.

This present method for reducing the number of multiplications is directed to the second case, i.e., where e varies and g is fixed or chosen from a small set. In this case, the user is required to repeatedly compute $g^e$ for large integer values of e. Of course, each $g^e$ may be computed by multiplying g by itself e times but this computation of $g^e$ requires so many multiplications that it is infeasible to compute $g^e$.

In the Diffie-Hellman key exchange example above, the smart card will have knowledge of the generator g and will have a particular personal identification number (PIN) which corresponds to a bit stream specifying the binary representation of e. After raising g to the eth power, $g^e$ may be broadcast over conventional communications lines without the fear of an intruder being able to determine the PIN number.

The general method for exponentiation provided by the invention is tailored to compute powers $g^e$ where e is an integer chosen between 1 and n for some large integer n. Recall that e is a randomly generated digital signal which is interpreted as the binary representation of an integer; and g is an integer or group of integers stored in memory 24 as digital signatures. The basic strategy utilized by this method is to use a small amount of auxiliary storage or memory 24 in the card 12 in place of some of the multiplications that are required.

The card 12 is initialized by storing a number of precomputed values of $g^{x_i}$, in memory 24 based on the amount of memory available in the card 12. One simple method is to precompute and store in memory the set $S=\{g^{2^i} | i=1, \ldots \lceil \log_2 e \rceil \}$. Here we use $\lceil x \rceil$ to denote the smallest integer that exceeds the number x, e.g., $\lceil 0.5 \rceil = 1$, and $\lceil 1 \rceil = 1$. Then $g^e$ may be computed in at most $\lceil \log_2 e \rceil / 2 + 1$ multiplication on average and only requires $1 + \lceil \log_2 e \rceil$ values in the group to be stored in memory. It should be noted that there is no reason to store powers of 2. The exponent may be represented in base b, using at most $\lceil \log_e \rceil + 1$ digits and then $g^{b^k}$ may be precomputed and stored, for $k=1, \ldots \lceil \log_b e \rceil$. The base b representation of e is $e = \Sigma_{i=0}^{m-1} a_i b^i$, where $m = \lceil \log_b e \rceil$.

Considering the above method in general terms, i.e., for other number systems, the first step is to select parameter m where m is determined by the amount of memory in computing device 12, then the parameter h and some integers $x_i$, $1 \leq i \leq m$, so that every integer e between 1 and n can be represented in the form:

$$e = \Sigma_{i=1}^m a_i x_i$$

where each $0 \leq a_i \leq h$, where h and the integers $x_i$ are determined to minimize the number of multiplications needed. Then $g^{x_i}$, $1 \leq i \leq m$, is precomputed and is stored in auxiliary storage or memory. The parameter h represents the upper bounds for $a_i$ and $a_i$ represents a weighting factor. For example, if e=55,453, and $x_i = 10^i$ for $0 \leq i \leq 4$ then $a_0 = 3$, $a_1 = 5$, $a_2 = 4$, $a_3 = 5$ and $a_4 = 5$, for base 10. The manner in which $a_i$ is determined for bases other than 10 is described below. As previously stated, the value for m is fixed by the amount of memory available, and further determined so as to minimize the amount of computation to compute $g_e$.

During usage in the example described above, the card 12 will be employed to make a transaction, at which time e will be internally randomly generated in the computing device card 12, which in a banking transaction may be a smart card.

The following example will be used throughout the detailed description but is provided for illustrative purposes only. Assuming that the bank has decided to use the group of residue classes of integers modulo 43 and set g=17, e=55,453 and that only five values of $g^{X_i}$ are going to be stored, viz m=5, $X_1=1$, $X_2=10$, $X_3=100$, and $X_4=1000$, and $X_5=10,000$. Thus, memory 24 will have the values for $17^1$ mod 43, $17^{10}$ mod 43, $17^{100}$ mod 43, $17^{1,000}$ mod 43, and $17^{10,000}$ mod 43 or simply the integers 17, 9, 14, 13, 15. The selection of $x_i$ is described below in greater detail for bases other than base 10.

Before considering a specific example based on the specific values set forth in the previous paragraph, some general considerations are in order. Using the equation $e = \Sigma_{i=1}^m a_i x_i$, we can then write $$g^e = \pi_{d=1}^h c_d{}^d$$

where $$c_d = \pi_{a_i = d} \, g^{x_i}$$

If we neglect for a moment the number of multiplications required for the precomputation of $g^{x_i}$, which need only be done once and then stored in the auxiliary storage or memory, then we have now reduced the problem of computing $g^e$ to the following steps:

Computing the individual $c_d$'s.
Computing the product $\pi_{d=1}^h c_d{}^d$.

The computation of $\pi_{d=1}^h c_d{}^d$ can be accomplished in exactly $2h-2$ multiplications. This is accomplished by a reduction computing $\pi_{d=1}^{h-1} c_d{}^d$ and setting $\bar{c}_1 = c_1 c_h$ and $\bar{c}_{h-1} = c_{h-1} c_h$. It then follows that $\pi_{d=1}^{h-1} c_d{}^d = \bar{c}_1 C_2{}^2 c_3{}^3 \ldots c_{h-2}{}^{h-2} \bar{c}_{h-1}{}^{h-1}$ and thus the reduction of the value of h by one only requires two extra multiplications. After h-2 reduction steps, $\bar{c}_1 \bar{c}_2{}^2$ needs to be computed and this can clearly be done using only 2 multiplications.

In case only t of the $c_d$'s are unequal to 1, then we can save h-t multiplications. The reason for this is the fact that whenever we multiply a 1 times $c_h$, we can simply do a memory copy rather than a full multiplication. Thus, the true number of multiplications for the previously described process is exactly $h+t-2$.

The method for computing the individual $c_d$'s is to simply group the terms corresponding to a fixed digit d and multiply them together. If there are L of the $c_d$'s that are unequal to 1, then the number of multiplications to compute all the $c_d$'s by this method is $n-L$. Taken all together this makes the total number of multiplications to compute $g^e$ at most $n+h-2$.

Turning again to the example above wherein e=55,453, to compute $c_1$, we would look for any occurrences of a 1 in e. In this case there are none, therefore $c_1 = 1$. Similarly, for $c_3$ we would look for the occurrence of a 3 in e. In this case, a 3 is present in the 1's place. Thus, $c_3 = g^1$, i.e., g raised to the power of the place in which the number is located. In a like fashion, $c_4 = g^{100}$; $c_5 = g^{10} \times g^{10,000}$.

$$g^e = \pi_{d=1}^h c_d^d$$

If the equation set forth above is used to calculate $g^e$, but as discussed above, this calculation requires a great number of multiplications to be performed by the CPU 20. The present invention enables a reduction, as described above, to be performed.

Using the example above, the original $c_4$ is replaced with $c_4 \cdot c_5$; original $c_1$ is replaced with $c_1 \cdot c_5$; and the original $c_5$ is discarded. It should be noted that the pattern is $c_5$ multiplied by $c_A$ and $c_B$ and the values of these multiplications are placed in place of $c_A$ and $c_B$. Additionally, it should be noted that A+B=5, thus in the above example, A could have been 3 and B could have been 2 instead of 4 and 1, respectively.

This reduction is then repeated for $c_4$ and $c_3$, by replacing $c_1$ by $c_1 \cdot c_4$ and $c_3$ by $c_3 \cdot c_4$, discarding $c_4$, and then replacing $c_1$ by $c_1 \cdot c_3$ and $c_2$ by $c_2 \cdot c_3$. At this point we compute $c_1 c_2^2$, giving the desired result. This multiplication will correspond in value to $g^e$ and, as stated above, will require significantly fewer multiplications.

Now that $g^e$ has been determined, the digital signal representation of $g^e$ is sent to the I/O port 26 along with other information such as digital signal representations of, for example, the purchase price of an item and store number. These signals are manipulated by the network interface or modem 14 so that they may be communicated over the network 16. This information is received by a second modem 14 and is then sent to the remote facility 18 which will verify the $g^e$ and send an authorization to the card 12 via the network. The authorization may also conform to DSS standards by using the above method.

As stated above, the selection of $x_i$ is performed in the initialization stage. A description will now be provided for selecting $x_i$ for any base b, where b is also chosen to minimize the number of multiplications. Suppose the system is designed to compute powers $g^e$ for e chosen between 1 and n. We then take the $x_i$ to be of the form $rb^k$, wherein b represents an integer base and the numbers r chosen are from a set R, and $0 \leq k \leq 2 \lceil \log_b n \rceil$. The set R should be chosen in such a way that every integer e has a representation of the form $$e = \Sigma_{i=1}^{n'} d_i b^{i-1}$$

where $n' = \lceil \log_b n \rceil$ and with $d_i$ an element of the set $$D(R,h) = \{[kr | r \in R, 0 \leq k \leq h]\}$$

D(R, h) is said to be a basic digit set if such a representation is possible for every e between 1 and n. If R and h are chosen appropriately, then D(R, h) is a basic digit set. One sufficient condition is given by D. W. Matula, in "Basic Digit Sets for Radix Representation", Journal of the ACM, Vol. 29 pp. 1131-1143 (1982), who proved that every integer has such a representation if D(R,h) contains a representative from every residue class modulo b, and if every integer between $$\frac{-\max\{s | s \in D\}}{b-1} \text{ and } \frac{-\min\{s | s \in D\}}{b-1}$$

can be so represented. Using this criteria it is easy to check whether a given choice of R and h fulfills the requirement that every integer have such a representation.

The computation of the $a_i$'s for a base b may be performed by the following procedure. Given a set D(R,h) that satisfies the conditions of Matula for the representation of every integer, there is a simple procedure to construct the representation. The procedure differs only slightly from a standard method of constructing the base b representation of a number, and requires repeated division by b. This procedure is set forth in "Basic Digit Sets for Radix Representation", and described in detail in Knuth's *The Art of Computer Programming*, Vol. 2, Seminumerical Algorithms, Second Edition (1988). In order to compute the representation of the integer e, we first divide by b, computing a quotient $q_o$ and a remainder $r_o$. We then find an integer $d_o$ in D(M,h) such that $d_o = a_o m_o$ with $m_o$ in M and $d_o = r_o$ (mod b). This can for example be done by looking up the value in a table. We then subtract $d_o$ from e, divide by b, and compute a new number $e_1$. Repeating the procedure with e replaced by $e_1$, we obtain the next digit $d_1$, and continuing in this way we construct the representation in the form:

$$e = \Sigma_{i=1}^{n'} a_i x_i$$

The choice of the set R and the integer h is dictated by exactly the amount of memory that is available in a given system and exactly how much computation is desired. In general, the more memory that is available, the less computation can be used. Some suggested choices for the parameters that can be used when relatively little memory is available are set forth below. Table 1 gives some choices for R and h for an exponent of 140 bits, and varying amounts of storage. By comparison, the binary method requires 209 multiplications on average, and 279 multiplications in the worst case. Table 2 gives data for an exponent of 512 bits. By comparison, the binary method requires 767 multiplications on average and 1023 in the worst case. For other size exponents or other amounts of storage, a simple computer search can be used to discover good choices of R and h. The times given are the number of multiplications required, neglecting the time for memory fetches or assignments (which can be expected to be much faster than multiplications).

TABLE No. 1

| b | R | h | expected time | worst-case time | storage |
|---|---|---|---|---|---|
| 13 | {1} | 12 | 45.08 | 48 | 38 |
| 19 | {±1} | 9 | 38.26 | 40 | 66 |
| 23 | {±1,±2} | 7 | 34.65 | 36 | 124 |
| 23 | {±1,±2,±7} | 5 | 32.65 | 34 | 186 |
| 37 | {±1,±3,±8,±10} | 6 | 30.27 | 31 | 216 |
| 43 | {±1,±3,±4,±10,±18} | 6 | 29.40 | 30 | 260 |

TABLE No. 2

| b | R | h | expected time | worst-case time | storage |
|---|---|---|---|---|---|
| 26 | {1} | 25 | 127.81 | 132 | 109 |
| 39 | {±1} | 19 | 111.51 | 114 | 194 |
| 53 | {±1,±2} | 17 | 103.30 | 105 | 360 |
| 67 | {±1,±2,±23} | 16 | 97.73 | 99 | 510 |
| 81 | {±1,±3,±26,±28} | 13 | 91.00 | 92 | 648 |
| 72 | {±1,±3,±4,±23,±25} | 11 | 90.85 | 92 | 830 |

If multiple processors are available, the time required by the method of the invention may be further reduced by doing computations in parallel. For example, suppose we have h processors. In this case, each processor can calculate its $c_d$ separately. The time needed to calculate $c_d$ depends on the number of $a_i$'s that are equal to d. Thus the time needed will depend on the largest number of $a_i$'s equal to each other. If fewer processors are used, then the $c_d$'s may be split as evenly as possible among the processors.

For computing $\pi_{d=1}^{h} c_d^d$ each processor can compute $c_d^d$ for one d using a standard addition chain method, taking at most 2 log h multiplications. Then $c_d^d$ may be combined by multiplying them together in pairs repeatedly to form $g^n$ (this is referred to as binary fan-in multiplication). This takes log h time.

For example, storing only powers of b, we may compute powers for a 140-bit exponent in the time necessary for 13 multiplications using 15 processors, taking b=16 and M={1}. For a 512-bit exponent, we can compute powers with 27 processors in the time for 17 multiplications, using b=28.

The disadvantage to this method is that each processor needs access to each of the powers $g^b$, so we either need a shared memory or every power stored at every processor. An alternative approach allows us to store only one power at each processor.

For this latter method, we will have k processors, each of which computes one $g^{a_i b_i}$ using a stored value and an addition chain for $a_i$. This will take at most 2 log h time. Then the processors multiply together their results using binary fan-in multiplication to get $g^n$. The total time spent is at most 2 log h + log k.

If the number of processors is not a concern, then the optimal choice of base is b=2, for which we need log N processors and log N time. We could compute powers for a 512-bit exponent with 512 processors in the time for 9 multiplications, and for a 140-bit exponent with 140 processors in the time for 8 multiplications. Taking a larger base reduces the number of processors, but increases the time.

The implementation of the invention described herein is shown as 100 in FIGS. 2a and 2b of identification schemes. FIGS. 3a, 3b, and 3c illustrate the invention incorporated in several signature schemes, and is also indicated as 100. The use of the invention in a verification system is shown in FIG. 4 and is also labeled as 100. Note that in these figures, the variable x corresponds to e as described herein; a corresponds to g; q corresponds to N; and r corresponds to y as described herein.

It will be appreciated if the method described above is applicable to various businesses including communications companies, banks issuing credit cards, cellular telephone operators, computer software companies, computer hardware companies, makers of cryptographic equipment, and the like. Moreover, some forthcoming technologies such as wireless local area networks can also benefit from this cryptographic scheme.

Although the present invention has been described to specific exemplary embodiments thereof, it will be understood by those skilled in the art that variations and modifications can be effected in these exemplary embodiments without departing from the scope and spirit of the invention.

What is claimed is:

1. In a cryptographic system, a method for transforming a first signal into a second signal in a manner infeasible to invert, said method comprising the steps of:
   (a) prestoring in a computing device a plurality of values $g^{x_i}$ in a plurality of memory locations within said computing device where $x_i$ is selected such that an integer $e = \Sigma a_i x_i$, where $a_i$ is an integer weight such that $0 \leq a_i \leq h$, and h is a positive integer, and g is a fixed signal unique to said cryptographic system;
   (b) representing a first randomly generated input digital signal as said integer e;
   (c) exponentiating said fixed signal, g, by the said integer e to generate said second signal, $y = g^e$, wherein said step of exponentiating further comprises:
   for each integer d with $1 \leq d \leq h$, computing the individual values of $c_d = \pi_{a_i=d} g^{x_i}$, i.e., $c_d$ will be the product of all the said values $g^{x_i}$, for the said memory locations, i, for which the value $a_i$ is equal to d;
   computing the product, $$\pi_{d=1}^{h} c_d^d$$

for the said individual values, $c_d$ to thereby determine a value for said second signal, $y = g^e$.

2. The method recited in claim 1 wherein said step of computing the product of $\pi_{d=1}^{h} C_d^d$ further comprising selecting positive integers r and s so that r+s=h, and
setting $\bar{C}_r = C_r C_h$;
setting $\bar{C}_s = C_s C_h$; and
setting $\bar{C}_i = C_i$ for $1 \leq i \leq h-1$, $i \neq r$ or s
computing $\pi_{d=1}^{h-1} \bar{C}_d^d$
which equals:

$$\pi_{d=1}^{h} c_d^d.$$

3. The method of claim 1, where the set $x_i$ is selected according to the rule $x_i = mb^k$ and where b represents an integer base and the values of m are selected from a set M and the values for k are greater than or equal to 0 less than or equal to $1 + \lceil \log_b N \rceil$, where N is the maximum possible value for the integer e, and the set M is chosen so that the set of integers jm, where m varies over the elements of M, and j varies between 0 and a predetermined integer h, is a basic digit set.

4. A method for generating digital signatures to assure the legitimacy of a message, said method comprising the steps of:
   (a) prestoring in a computing device a plurality of values $g^{x_i}$ in a plurality of memory locations within said computing device where $x_i$ is selected such that an integer $e = \Sigma a_i x_i$, where $a_i$ is an integer weight such that $0 \leq a_i \leq h$, and h is a positive integer, and g is fixed signal unique to said digital signature method;
   (b) representing a first randomly generated input digital signal as said integer e;
   (c) exponentiating said fixed signal, g, by the said integer e to generate a second signal, $y = g^e$, wherein said step of exponentiating further comprises:
   for each integer d with $1 \leq d \leq h$, computing the individual values of $c_d = \pi_{a_i=d} g^{x_i}$, i.e., $c_d$ will be the product of all the said values $g^{x_i}$, for the said memory locations, i, for which the value $a_i$ is equal to d;

computing the product, $$\pi_{d=1}^{h} c_d{}^d$$

for the said individual values, $c_d$ to thereby determine a value for said second signal, $y=g^e$, (d) generating a digital signature, s, of a message, m, using said second signal, y, and particular inputs specified by a particular digital signature scheme; and (e) verifying said digital signature, s, as originating from said legitimate user.

5. The method recited in claim 4 wherein said step of computing the product of $\pi_{d=1}^{h} C_d{}^d$ further comprising selecting positive integers r and s so that r+s=h, and
setting $\bar{C}_r = C_r C_h$;
setting $\bar{C}_s = C_s C_h$; and
setting $\bar{C}_i = C_i$ for $1 \leq i \leq h-1$, $i \neq r$ or s
computing $\pi_{d=1}^{h-1} \bar{C}_d{}^d$
which equals:

$$\pi_{d=1}^{h} c_d{}^d.$$

6. The method of claim 4, where the set $x_i$ is selected according to the rule $x_i = mb^k$ and where b represents an integer base and the values of m are selected from a set M and the values for k are greater than or equal to 0 less then or equal to $1 + \lceil \log_b N \rceil$, where N is the maximum possible value for the integer e, and the set M is chosen so that the set of integers jm, where m varies over the elements of M, and j varies between 0 and a predetermined integer h, is a basic digit set.

7. A method for verifying of an individual or device, said method comprising the steps of:

(a) prestoring in a computing device a plurality of values $g^{x_i}$ in a plurality of memory locations within said computing device where $x_i$ is selected such that an integer $e = \Sigma a_i x_i$, where $a_i$ is an integer weight such that $0 \leq a_i \leq h$, and h is a positive integer, and g is fixed signal unique to said verification method (b) representing a first randomly generated input digital signal as said integer e;

(c) exponentiating said fixed signal, g, by the said integer e to generate a second signal, $y = g^e$, wherein said step of exponentiating further comprises:

for each integer d with $1 \leq d \leq h$, computing the individual values of $C_d = \pi_{a_i=d} g^{x_i}$, i.e., $C_d$ will be the product of all the said values $g^{x_i}$, for the said memory locations, i, for which the value $a_i$ is equal to d;

computing the product, $$\pi_{d=1}^{h} c_d{}^d$$

for the said individual values, $c_d$ to thereby determine a value for said second signal, $y = g^e$;

(d) sending said second signal, y, to a verifier;

(e) receiving a third signal, z, from the verifier;

(f) generating a fourth signal, x, using said second signal, said third signal, and other inputs as specified by a particular identification scheme; and (g) verifying said fourth signal as originating from said individual or device.

8. The method recited in claim 7 wherein said step of computing the product of $\pi_{d=1}^{h} c_d{}^d$ further comprising selecting positive integers r and s so that r+s=h, and
setting $\bar{C}_r = C_r C_h$;
setting $\bar{C}_s = C_s C_h$; and
setting $\bar{C}_i = C_i$ for $1 \leq i \leq h-1$, $i \neq r$ or s
computing $\pi_{d=1}^{h-1} \bar{c}_d{}^d$
which equals:

$$\pi_{d=1}^{h} c_d{}^d.$$

9. The method of claim 7, where the set $x_i$ is selected according to the rule $x_i = mb^k$ and where b represents an integer base and the values of m are selected from a set M and the values for k are greater than or equal to 0 less than or equal to $1 + \lceil \log_b N \rceil$, where N is the maximum possible value for the integer e, and the set M is chosen so that the set of integers jm, where m varies over the elements of M, and j varies between 0 and a predetermined integer h, is a basic digit set.

* * * * *